United States Patent
Königer et al.

(10) Patent No.: US 6,777,089 B1
(45) Date of Patent: Aug. 17, 2004

(54) RADIATION-CURABLE COMPOSITE LAYERED SHEET OR FILM

(75) Inventors: Rainer Königer, Freinsheim (DE); Erich Beck, Ladenburg (DE); Achim Grefenstein, Altrip (DE); Reinhold Schwalm, Wachenheim (DE); Margit Veeh, Ulm (DE); Claudia Vogel, Stuttgart (DE); Walter Aichholzer, Hemmingen (DE); Thomas Gruber, Neu-Ulm (DE); Karl Holdik, Ulm (DE)

(73) Assignees: BASF Aktiengesellschaft, Ludwigshafen (DE); DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/926,366

(22) PCT Filed: Apr. 11, 2000

(86) PCT No.: PCT/EP00/03221

§ 371 (c)(1),
(2), (4) Date: Oct. 22, 2001

(87) PCT Pub. No.: WO00/63015

PCT Pub. Date: Oct. 26, 2000

(30) Foreign Application Priority Data

Apr. 21, 1999 (DE) .......................................... 199 17 965

(51) Int. Cl.$^7$ .......................... B32B 27/30; B32B 27/40
(52) U.S. Cl. ....................... 428/421; 428/482; 428/483; 428/518; 428/520; 428/522

(58) Field of Search ............................... 428/411.1, 518, 428/522, 520, 483, 482, 421; 427/372.2

(56) References Cited

U.S. PATENT DOCUMENTS

| | | | | |
|---|---|---|---|---|
| 4,855,184 A | * | 8/1989 | Klun et al. ............... | 428/425.1 |
| 5,387,304 A | | 2/1995 | Berner et al. | |
| 5,912,081 A | | 6/1999 | Negele et al. | |
| 6,127,039 A | * | 10/2000 | Saitoh et al. ............ | 428/425.9 |
| 6,136,882 A | * | 10/2000 | Daly et al. .................. | 522/107 |
| 6,380,279 B1 | * | 4/2002 | Moens et al. ............... | 522/111 |
| 6,500,545 B1 | * | 12/2002 | Ambrose et al. ........... | 428/413 |

FOREIGN PATENT DOCUMENTS

| | | |
|---|---|---|
| CA | 2221266 | 6/1998 |
| DE | 196 28 966 | 12/1997 |
| DE | 196 54 918 | 1/1998 |
| DE | 196 51 350 | 6/1998 |
| EP | 0 307 918 | 3/1989 |
| EP | 0 361 351 | 4/1990 |
| EP | 0 632 333 | 1/1995 |
| EP | 0 850 757 | 7/1998 |
| EP | 0 874 027 | 10/1998 |

* cited by examiner

Primary Examiner—D. Lawrence Tarazano
(74) Attorney, Agent, or Firm—Oblon, Spivak, McClelland, Maier & Neustadt, P.C.

(57) ABSTRACT

A radiation-curable composite layered sheet or film comprising at least one substrate layer and one outer layer, said outer layer being composed of a radiation-curable composition having a glass transition temperature of more than 40° C.

23 Claims, No Drawings

RADIATION-CURABLE COMPOSITE LAYERED SHEET OR FILM

The invention relates to a radiation-curable composite layered sheet or film comprising at least one substrate layer and one outer layer, said outer layer being composed of a radiation-curable composition having a glass transition temperature of more than 40° C.

The specification further relates to a process for producing the radiation-curable composite layered sheet or film and to a process for producing moldings coated with said sheet or film.

DE-A-196 28 966 and DE-A-196 54 918 disclose dry-paint films where the paint has a glass transition temperature of less than 40° C. Curing requires two steps: a partial cure before the film is adhesively bonded to substrates, and the final cure thereafter.

EP-A-361 351 likewise discloses a dry-paint film. Here, the film is radiation-cured before being applied to the substrate moldings.

DE-A-196 51 350 (O.Z. 47587) describes composite layered sheets and films which consist of thermoplastic materials and do not have a radiation-curable coating.

A disadvantage of the radiation-curable dry-paint films known to date is that two or more steps are frequently required to effect the radiation cure, as described in DE-A-196 28 966. Where the film is fully radiation-cured prior to the coating operation, it often becomes brittle and difficult to deform, which is deleterious to its further processing.

With existing radiation-curable films, the coated moldings often lack sufficient scratch resistance and sufficient elasticity when worked on mechanically. It is an object of the present invention to provide radiation-curable composite layered sheets or films which are easy to process and which lend themselves to the coating of moldings by extremely simple techniques. The coated moldings are to have good mechanical properties, effective resistance to external influences, such as a good weathering stability, for example, and in particular are to be mechanically stable—having, for example, good scratch resistance and high elasticity.

We have found that this object is achieved by the radiation-curable composite layered sheet or film defined at the outset and referred to for short as film hereinafter. We have also found processes for coating moldings with the film, and the coated moldings.

The film must include a substrate layer and an outer layer which is applied to the substrate layer directly or, where there are further interlayers, indirectly.

Outer Layer

The outer layer is radiation-curable. Accordingly, the outer layer composition used is radiation-curable and comprises groups curable by a free-radical or ionic mechanism (curable groups for short). Preference is given to free-radically curable groups.

The radiation-curable composition is preferably transparent. After curing has been accomplished, as well, the outer layer is preferably transparent: that is, it is a clearcoat layer.

A key constituent of the radiation-curable compositions is the binder, which by filming forms the outer layer.

The radiation-curable composition preferably comprises a binder selected from
i) polymers containing ethylenically unsaturated groups
ii) mixtures of i) with ethylenically unsaturated compounds of low molecular mass
iii) mixtures of saturated thermoplastic polymers with ethylenically unsaturated compounds.

i)
Examples of suitable polymers include those of ethylenically unsaturated compounds, but also polyesters, polyethers, polycarbonates, polyepoxides or polyurethanes.

They suitably include unsaturated polyester resins, which consist essentially of polyols, especially diols, and polycarboxylic acid, especially dicarboxylic acid, where one of the esterification components contains a copolymerizable, ethylenically unsaturated group. Examples of the components in question include maleic acid, fumaric acid, and maleic anhydride.

Preference is given to polymers of ethylenically unsaturated compounds, such as are obtained in particular by means of free-radical addition polymerization.

The free-radical addition polymers include, in particular, polymers composed of more than 40% by weight, with particular preference more than 60% by weight, of acrylic monomers, particularly $C_1$–$C_8$, preferably $C_1$–$C_4$, alkyl (meth)acrylates. By way of ethylenically unsaturated groups, the polymers include in particular (meth)acrylic groups. These groups may be attached to the polymer by, for example, reacting (meth)acrylic acid with epoxide groups in the polymer (e.g., by using glycidyl (meth)acrylate as a comonomer).

Preference is likewise given to polyurethanes. Their unsaturated groups are again preferably (meth)acrylic groups, attached to the polyurethane by reacting hydroxyalkyl (meth)acrylates with isocyanate groups, for example.

The polymers i) per se can be processed as thermoplastics.

ii)
The unsaturated polymers i) may also be used in mixtures with ethylenically unsaturated compounds of low molecular mass.

Low molecular mass compounds in this context are compounds having a number average molecular weight of less than 2000 g/mol (as determined by gel permeation chromatography using a polystyrene standard).

Suitable examples include free-radically polymerizable compounds containing only one ethylenically unsaturated, copolymerizable group.

By way of example, mention may be made of $C_1$–$C_{20}$ alkyl (meth)acrylates, vinylaromatics having up to 20 carbon atoms, vinyl esters of carboxylic acids containing up to 20 carbon atoms, ethylenically unsaturated nitriles, vinyl ethers of alcohols containing from 1 to 10 carbon atoms, and aliphatic hydrocarbons having from 2 to 20, preferably from 2 to 8, carbon atoms and 1 or 2 double bonds.

Preferred alkyl (meth)acrylates are those with a $C_1$–$C_{10}$ alkyl radical, such as methyl methacrylate, methyl acrylate, n-butyl acrylate, ethyl acrylate and 2-ethylhexyl acrylate.

Also suitable, in particular, are mixtures of the alkyl (meth)acrylates.

Examples of vinyl esters of carboxylic acids having from 1 to 20 carbon atoms are vinyl laurate, vinyl stearate, vinyl propionate, and vinyl acetate.

Examples of suitable vinylaromatic compounds are vinyltoluene, α-butylstyrene, 4-n-butylstyrene, 4-n-decylstyrene, and preferably styrene.

Examples of nitriles are acrylonitrile and methacrylonitrile.

Examples of suitable vinyl ethers are vinyl methyl ether, vinyl isobutyl ether, vinyl hexyl ether, and vinyl octyl ether.

As nonaromatic hydrocarbons having from 2 to 20, preferably from 2 to 8, carbon atoms and one or two olefinic double bonds, mention may be made of butadiene, isoprene, and also ethylene, propylene, and isobutylene.

Compounds contemplated include preferably free-radically polymerizable compounds containing two or more ethylenically unsaturated groups.

The compounds in question are particularly (meth)acrylate compounds, with preference being given in each case to the acrylate compounds: i.e., the derivatives of acrylic acid.

Preferred (meth)acrylate compounds contain from 2 to 20, more preferably from 2 to 10, and with very particular preference from 2 to 6, copolymerizable, ethylenically unsaturated double bonds.

As (meth)acrylate compounds mention may be made of (meth)acrylates and in particular acrylates of polyfunctional alcohols, especially those which contain no functional groups other than the hydroxyl groups or, if having further functional groups, contain only ether groups. Examples of such alcohols include difunctional alcohols, such as ethylene glycol and propylene glycol, and their higher condensation analogs, such as diethylene glycol, triethylene glycol, dipropylene glycol, tripropylene glycol, etc., butanediol, pentanediol, hexanediol, neopentyl glycol, alkoxylated phenolic compounds, such as ethoxylated and/or propoxylated bisphenols, cyclohexanedimethanol, alcohols with a functionality of three or more, such as glycerol, trimethylolpropane, butanetriol, trimethylolethane, pentaerythritol, dimethylolpropane, dipentaerythritol, sorbitol, mannitol, and the corresponding alkoxylated alcohols, especially ethoxylated and propoxylated alcohols.

The alkoxylation products are obtainable conventionally by reacting the above alcohols with alkylene oxides, especially ethylene oxide or propylene oxide. With preference the degree of alkoxylation per hydroxyl group is from 0 to 10, i.e., 1 mol of hydroxyl group may be alkoxylated preferably with up to 10 mol of alkylene oxides.

(Meth)acrylate compounds further include polyester (meth)acrylates, which are the (meth)acrylic esters of polyesterols.

Examples of suitable polyesterols are those such as may be prepared by esterifying polycarboxylic acids, preferably dicarboxylic acids, with polyols, preferably diols. The starting materials for such hydroxyl-containing polyesters are known to the skilled worker. As dicarboxylic acids preferential use may be made of succinic acid, glutaric acid, adipic acid, sebacic acid, o-phthalic acid, their isomers and hydrogenation products, and also esterifiable derivatives, such as anhydrides or dialkyl esters of said acids. Suitable polyols include the abovementioned alcohols, preferably ethylene glycol, 1,2- and 1,3-propylene glycol, 1,4-butanediol, 1,6-hexanediol, neopentyl glycol, and cyclqhexanedimethanol, and also polyglycols of the ethylene glycol and propylene glycol types.

Polyester (meth)acrylates may be prepared in a plurality of stages or else in a single stage, as described, for example, in EP 279 303, from acrylic acid, polycarboxylic acid, and polyol.

iii)

Examples of suitable saturated thermoplastic polymers include polymethyl methacrylate, polystyrene, high-impact polymethyl methacrylate, high-impact polystyrene, polycarbonate and polyurethanes.

Radiation-curability is ensured by adding an ethylenically unsaturated, radiation-curable compound. This may be one of the compounds listed under i) and/or ii).

A key feature of the binder i) to iii) is that its glass transition temperature (Tg) is more than 40° C., preferably more than 50° C., and with particular preference more than 60° C. In general, the Tg will not exceed a level of 130° C. (The figures relate to the binder before radiation curing.)

The glass transition temperature, Tg, of the binder may be determined by the DSC (differential scanning calorimetry) method in accordance with ASTM 3418/82.

The amount of the curable groups, i.e., the ethylenically unsaturated groups, is preferably from 0.001 to 0.2 mol, with particular preference from 0.005 to 0.15 mol, with very particular preference from 0.01 to 0.1 mol, per 100 g of binder (solids; that is, without water or other solvents).

The binder preferably has a viscosity of from 0.02 to 100 Pas at 140° C. (as determined in a rotational viscometer).

The radiation-curable compositions may include further constituents. Particular mention may be made of photoinitiators, leveling agents, and stabilizers. For outdoor use, i.e., for coatings directly exposed to daylight, the compositions will particularly include UV absorbers and free-radical scavengers.

UV absorbers convert UV radiation into heat energy. Known UV absorbers include hydroxybenzophenones, benzotriazoles, cinnamic esters, and oxalanilides.

Free-radical scavengers bind free-radical intermediates that are formed. Major free-radical scavengers include sterically hindered amines, known as HALS (hindered amine light stabilizers).

For outdoor applications, the overall UV absorber and free-radical scavenger content is preferably from 0.1 to 5 parts by weight, with particular preference from 0.5 to 4 parts by weight, based on 100 parts by weight of the radiation-curable compounds.

Moreover, besides radiation-curable compounds, the radiation-curable composition may further include compounds which contribute to curing by other chemical reactions. Suitable examples include polyisocyanates, which crosslink with hydroxyl or amino groups.

The radiation-curable composition may be in water-free and solvent-free form, or in the form of a solution or dispersion.

Preference is given to water- and solvent-free radiation-curable compositions, or aqueous solutions or aqueous dispersions.

Particular preference is given to water- and solvent-free radiation-curable compositions.

The radiation-curable composition is thermoplastically deformable and in particular may be extruded.

The above radiation-curable compositions form the outer layer. The layer thickness (after drying and curing) is preferably from 10 to 100 $\mu$m.

Substrate Layer

The substrate layer serves as a support and is intended to ensure that the composite as a whole remains permanently tough.

The substrate layer consists preferably of a thermoplastic polymer, particularly polymethyl methacrylates, polybutyl methacrylates, polyurethanes, polyethylene terephthalates, polybutylene terephthalates, polyvinylidene fluorides, polyvinyl chlorides, polyesters, polyolefins, polyamides, polycarbonates (PC), acrylonitrile-butadiene-styrene (ABS) polymers, acrylic-styrene-acrylonitrile (ASA) copolymers, acrylonitrile-ethylene-propylene-diene-styrene copolymers (A-EPDM), polyether imides, polyether ketones, polyphenylene sulfides, polyphenylene ethers or mixtures thereof.

Preference is given to ASA, especially in accordance with DE 19 651 350, and to the ASA/PC blend. Preference is likewise given to polymethyl methacrylate (PMMA) or impact-modified PMMA.

The layer thickness is preferably from 50 $\mu$m up to 5 mm. Particular preference, especially when the substrate layer is injection-backmolded, is given to thicknesses of from 100 to 1000 $\mu$m, in particular from 100 to 500 $\mu$m.

The polymer of the substrate layer may comprise additives, especially fillers or fibers. The substrate layer may also be colored, in which case it may also act as a coloring layer.

Further Layers

The film may include further layers in addition to the outer layer and the substrate layer.

Suitable examples include coloring interlayers or further layers of thermoplastic material (thermoplastic interlayers), which strengthen the film or serve as release layers.

Thermoplastic interlayers may be made of the polymers listed above under Substrate layer.

Particular preference is given to polymethyl methacrylate (PMMA), preferably impact-modified PMMA. Mention may also be made of polyurethane. Coloring layers may likewise consist of said polymers. They include dyes or pigments which are distributed in the polymer layer.

One preferred film has, for example, the following layer structure, the alphabetical sequence corresponding to the spatial disposition:

A) outer layer
B) thermoplastic interlayer (optional)
C) coloring interlayer (optional)
D) substrate layer
E) adhesive layer (optional)

On the reverse side (reverse for short) of the substrate layer (i.e., the side facing the article to be coated) there may have been applied an adhesive layer, where the film is to be bonded adhesively to the substrate.

Applied to the transparent outer layer there may be a protective layer, e.g., a removable film, which prevents unintended curing. Its thickness may amount, for example, to from 50 to 100 $\mu$m. The protective layer may be composed, for example, of polyethylene or polyterephthalate. The protective layer may be removed prior to irradiation.

Alternatively, irradiation may take place through the protective layer; for this, the protective layer must be transparent in the irradiation wavelength range.

The overall thickness of the film is preferably from 50 to 1000 $\mu$m.

Production of the Composite Sheet or Film

The production of a composite from the layers B) to D) may take place, for example, by coextrusion of all or some of the layers.

For coextrusion, the individual components are fluidified in extruders and, using special means, are contacted with one another in such a way as to give the films having the layer sequence described above. For example, the components may be coextruded through a slot die. This process is elucidated in EP-A2-0 225 500. As a supplement to the processes described herein, it is also possible to use the process known as adapter coextrusion.

The composite may be produced by conventional processes, for example, by coextrusion, as described above, or by lamination of the layers, in a heatable nip, for example. In this way it is possible first of all the produce a composite of the layers except for the outer layer, and then to apply the outer layer by conventional techniques.

The radiation-curable composition may be applied to the substrate layer or the composite in a simple way, by casting, rolling, knife coating, spraying, etc., for example, and dried where appropriate.

Preference is given to extruding the radiation-curable composition, i.e., the outer layer. Where appropriate, the radiation-curable composition may also be coextruded with one or more further layers.

In the case of extrusion (including coextrusion) of the radiation-curable compositions, the preparation of the radiation-curable composition by mixing of its constituents, and the preparation of the outer layer, may take place in one operation.

To this end, thermoplastic constituents, e.g., unsaturated polymers i) or saturated polymers iii) (see above), may first of all be melted in the extruder. The requisite melting temperature depends on the polymer in question. After the melting operation, preferably, the further constituents may be metered in, especially radiation-curable compounds ii) of low molecular mass (see above). The compounds act as plasticizers, thereby reducing the temperature at which the composition is in melt form. The temperature on addition of the radiation-curable compound must lie in particular below a critical temperature at which the radiation-curable compound undergoes thermal curing.

The critical temperature may easily be determined by means of a calorimetric measurement, i.e., a measurement of the heat absorbed with increasing temperature, in accordance with the above-described determination of the glass transition temperature.

The radiation-curable composition is then extruded directly as the outer layer onto the existing composite or, in the case of coextrusion, is extruded with layers of the composite. Extrusion leads directly to the composite layered sheet or film.

The outer layer is blocking-resistant, i.e., does not adhere, and is radiation-crosslinkable. The composite sheet or film is thermoplastically deformable. If desired, a protective layer (protective film) may be laid down on the outer layer directly following production of the composite sheet or film.

The composite layered sheet or film possesses high gloss and good mechanical properties. Rarely is cracking observed.

The extensibility of the composite layered sheet or film is preferably at least 100%, relative to the unextended state (at 140° C., with a thickness of 30 $\mu$m).

Use Processes

The film may be stored without partial curing (as described in DE-A-19 628 966) until subsequent use.

There is very little, if any, sticking or deterioration in performance properties observed up until the time of subsequent use.

The film is used preferably as a coating material.

In this case, a preferred procedure is first to coat the substrates and then to cure the outer layer by means of radiation.

Coating may take place by bonding the film to the substrates. For this purpose, on the reverse of the substrate layer, the film is preferably provided with the adhesive layer E. Suitable substrates include those of wood, plastic or metal.

Coating may also take place by injection backmolding of the film. For this purpose the film is thermoformed, preferably in a thermoforming mold, and the reverse of the substrate layer is injection-backmolded with polymer composition. The polymer composition comprises, for example, polymers which were listed above in the description of the substrate layer or, for example, polyurethane, especially polyurethane foam. The polymers may comprise additives, particular examples including fibers, such as glass fibers, or fillers.

The radiation curing of the outer layer takes place in this case preferably after the thermoforming operation and with particular preference after the injection backmolding of the film.

The radiation cure is effected with high-energy light, e.g., UV light, or electron beams. It may take place at relatively high temperatures. Preference is given here to a temperature above the Tg of the radiation-curable binder.

Where crosslinkers which bring about additional thermal crosslinking, such as isocyanates, have been included too, it is possible to carry out thermal crosslinking by raising the temperature to up to 150° C., preferably up to 130° C., which can be done, for example, simultaneously with or else subsequent to radiation curing.

Applications and Advantages

The films may be used to coat shaped articles. Any desired shaped articles are amenable. With particular preference, the films are used to coat shaped articles where very good surface properties, high weathering stability, and good UV resistance are important. The resulting surfaces are, moreover, highly scratch-resistant and firmly adhering, thereby reliably preventing destruction of the surfaces by scratching or delamination of the surfaces. Accordingly, shaped articles for use outdoors, outside of buildings, constitute a preferred area of application. In particular, the films are used to coat motor vehicle parts, with suitable examples including wings, door trim components, fenders, spoilers, skirts, and exterior mirrors.

EXAMPLES

I Synthesis of a Radiation-curable Coating Material 426.2 g of isopropylidenedicyclohexanol were dispersed roughly in 566.3 g of hydroxyethyl acrylate at 60° C. with stirring. To this dispersion there were added 1695.2 g of an isocyanurate of hexamethylene diisocyanate, 1.34 g of hydroquinone monomethyl ether, 2.69 g of 1,6-di-tert-butyl-para-cresol and 0.134 g of phenothiazine. Following the addition of 0.538 g of dibutyltin dilaurate, the batch heated up to 93° C. over the course of 20 minutes. After it had been cooled to 75° C., 300 g of acetone were metered in. When the NCO value had dropped to 0.66%, a further 370 g of acetone were added, followed by dropwise addition of 14.87 g of methanol. The mixture was then stirred at 60° C. until the NCO value had fallen to 0. The resin was admixed with an appropriate photoinitiator, applied to a Luran S 797 injection backmolding film, and exposed at 100° C. The pencil hardness of the films was determined in accordance with ASTM D 3363. Pencil hardness of the coated film: 2H Comparison: pencil hardness of the untreated injection backmolding film (Luran S 797): B Comparison: pencil hardness of the injection-backmolding protection film (Lucryl G 87): softer than 6B Two uncured acrylated polyacrylates having different Tg values, and the uncured urethane acrylate, were applied to a Luran S support film and thermoformed at an elevated temperature. After thermoforming, the films were exposed at 100° C.

Hardness of the films:

Urethane acrylate 2H

Binder resin (Tg (before exposure)=46° C.) 3H

Binder resin (Tg (before exposure)=−6° C.) H

II Production of a Radiation-curable Outer Layer

IIa

First of all, a photoactive mixture was prepared by mixing the following constituents:

| Material | % by weight | chemical composition |
|---|---|---|
| Ebecryl ® 40 | 23 | Alkoxylated pentaerythritol triacrylate (UCB) |
| Ebecryl ® IRR 264 | 41 | Triacrylate of a tris(2-hydroxy-ethyl) isocyanurate (UCB) |
| Ebecryl ® 1290 | 11 | Aliphatic urethane acrylate (UCB) |
| Ebecryl ® 5129 | 11 | Aliphatic urethane acrylate (UCB) |
| Ebecryl ® 350 | 5 | Silicone diacrylate (UCB) |
| Tinuvin ® 292 | 1 | HALS additive (Ciba SC) |
| Tinuvin ® 400 | 1 | UV absorber (Ciba SC) |
| Irgacure ® 184 | 6 | Photoinitiator (Ciba SC) |
| Lucirin ® TPO | 1 | Photoinitiator (BASF) |

The polymethyl methacrylate (PMMA) Lucryl® G 55 was melted at from 190 to 220° C. in an extruder and the photoactive mixture (one part by weight of the mixture to three parts by weight of Lucryl) was metered into the melt at below 170° C. The resulting melt was extruded in the form of a radiation-curable film.

The film obtained was blocking-resistant (i.e., nonadhering) and the resulting composite film was deformable and thermoformable. The radiation-curable outer layer was cured using UV light. (120 W/cm, belt speed 2 to 3 m/min).

IIb

The photoactive mixture consisted of:

| Material | % by weight | chemical composition |
|---|---|---|
| Ebecryl 2000 | 43 | Aliphatic urethane acrylate (UCB) |
| Ebecryl 264 | 22 | Aliphatic triacrylate of a urethane acrylate in HDDA (UCB) |
| Lucirin TPO-L | 1 | Photoinitiator (BASF) |
| CGI 184 | 5 | Photoinitiator (Ciba SC) |
| Tinuvin 292 | 2 | HALS additive (Ciba SC) |
| Tinuvin 400 | 2 | UV absorber (Ciba SC) |
| SR 9003 | 7 | Propoxylated neopentyl glycol diacrylate (Cray Valley) |
| Ebecryl 350 | 2 | Silicone diacrylate (UCB) |
| CN 965 | 10 | Aliphatic UR-Ac (Cray Valley) |
| SR 344 | 5 | Polyethylene glycol diacrylate (Cray Valley) |

The polyurethane KU-1-8602 (Bayer) was melted at 180 to 220° C. in an extruder and the photoactive mixture (one part by weight to three parts by weight of polyurethane) was metered into the melt at 160° C. The resulting melt was extruded in the form of a radiation-curable film.

The resulting outer layer was blocking-resistant, and the resulting film was deformable and thermoformable.

The radiation-curable outer layer was cured using UV light (120 W/cm, belt speed 2 to 3 m/min).

What is claimed is:

1. A self-supporting, radiation-curable, composite layered sheet or film comprising
   at least one substrate layer, and
   one outer layer, and
   a thermoplastic interlayer between the at least one substrate layer and the outer layer, wherein the thermoplastic interlayer comprises a polymer selected from the group consisting of polymethyl methacrylates, polybutyl methacrylates, polyethylene terephthalates, polybutylene terephthalates, polyvinylidene fluorides, polyvinyl chlorides, polyolefins, polyamides, polycarbonates, acrylonitrile-butadiene-styrene (ABS) polymers, acrylic-styrene-acrylonitrile (ASA) copolymers, acrylonitrile-ethylene-propylene-diene-styrene copolymers (A-EPDM), polyether imides, polyether ketones, polyphenylene sulfides, polyphenylene ethers and mixtures thereof; and the outer layer comprises a radiation-curable composition comprising a binder having a glass transition temperature of more than 40° C.

2. A method of using a radiation-curable composite layered sheet or film, the method comprising coating the sheet or film of claim 1 on a surface.

3. The sheet or film as claimed in claim 1, wherein the outer layer is transparent.

4. The sheet or film as claimed in claim 1, further comprising a coloring interlayer between the at least one substrate layer and the outer layer.

5. The sheet or film as claimed in claim 1, wherein the radiation-curable composition is in a noncrosslinked state.

6. The sheet or film as claimed in claim 1, wherein the radiation-curable composition comprises polymers containing ethylenically unsaturated groups, alone or as a mixture with low molecular mass, radiation-curable compounds, or mixtures of saturated, thermoplastic polymers with ethylenically unsaturated compounds.

7. The sheet or film as claimed in claim 1, wherein the at least one substrate layer comprises a layer comprising a thermoplastic polymer selected from the group consisting of polymethyl methacrylates, polybutyl methacrylates, polyurethanes, polyethylene terephthalates, polybutylene terephthalates, polyvinylidene fluorides, polyvinyl chlorides, polyesters, polyolefins, polyamides, polycarbonates, acrylonitrile-butadiene-styrene (ABS) polymers, acrylic-styrene-acrylonitrile (ASA) copolymers, acrylonitrile-ethylene-propylene-diene-styrene copolymers (A-EPDM), polyether imides, polyether ketones, polyphenylene sulfides, polyphenylene ethers and mixtures thereof.

8. A method of making a radiation-curable composite layered sheet or film, the method comprising extruding a radiation-curable composition comprising a binder having a glass transition temperature of more than 40° C.; and producing the film or sheet of claim 1.

9. The method as claimed in claim 8, wherein the extruding comprises coextruding at least one further layer with the radiation-curable composition.

10. A method of using a radiation-curable composite layered sheet or film, the method comprising adhesively bonding the sheet or film of claim 1 to a surface; and curing the outer layer of the bonded sheet or film by means of radiation.

11. A method of using a radiation-curable composite layered sheet or film, the method comprising thermoforming the sheet or film of claim 1 in a thermoforming mold;

injection-backmolding the reverse of the at least one substrate layer with a polymer composition; and radiation-curing the outer layer after the thermoforming or after the injection backmolding.

12. A coated molding obtainable by a process comprising coating the sheet or film of claim 1 on a molding; and curing the outer layer of the coated sheet or film by means of radiation.

13. The sheet or film as claimed in claim 1, wherein the binder has a glass transition temperature in a range of from 40 to 130° C.

14. The sheet or film as claimed in claim 1, wherein the binder has a glass transition temperature in a range of from 50 to 130° C.

15. The sheet or film as claimed in claim 1, wherein the binder has a glass transition temperature in a range of from 60 to 130° C.

16. The sheet or film as claimed in claim 1, wherein the binder comprises an ethylenically unsaturated member of the group consisting of polyesters, polyethers, polycarbonates, polyepoxides and polyurethanes.

17. The sheet or film as claimed in claim 16, wherein the binder comprises an ethylenically unsaturated member of the group consisting of polyethers, polycarbonates, polyepoxides and polyurethanes.

18. The sheet or film as claimed in claim 1, wherein the binder has a viscosity in a range of from 0.02 to 100 Pas at 140° C.

19. The sheet or film as claimed in claim 1, wherein the radiation-curable composition is curable by a free-radical or ionic mechanism.

20. The coated molding as claimed in claim 12, wherein the coated molding or vehicle part.

21. The sheet or film as claimed in claim 1, wherein the thermoplastic interlayer comprises polymethyl methacrylate.

22. The sheet or film as claimed in claim 1, further comprising an adhesive layer in contact with the at least one substrate layer opposite the thermoplastic interlayer.

23. The method of claim 8, wherein the radiation-curable composition is water-free and solvent-free during the extruding.

* * * * *